(12) United States Patent
Nanri et al.

(10) Patent No.: US 11,192,286 B2
(45) Date of Patent: Dec. 7, 2021

(54) PHASE ADJUSTING DEVICE AND PHASE ADJUSTING METHOD

(71) Applicant: FANUC CORPORATION, Yamanashi (JP)

(72) Inventors: Kodai Nanri, Yamanashi-ken (JP); Satoshi Yano, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 17/026,458

(22) Filed: Sep. 21, 2020

(65) Prior Publication Data

US 2021/0094211 A1    Apr. 1, 2021

(30) Foreign Application Priority Data

Sep. 30, 2019 (JP) .............................. JP2019-179934
Aug. 6, 2020 (JP) .............................. JP2020-133583

(51) Int. Cl.
*B29C 45/76* (2006.01)

(52) U.S. Cl.
CPC ................. *B29C 45/7613* (2013.01)

(58) Field of Classification Search
CPC .. B29C 45/5008; B29C 45/76; B29C 45/7613
See application file for complete search history.

(56) References Cited

U.S. PATENT DOCUMENTS

| 5,704,250 A * | 1/1998 | Black ..................... B23Q 5/408 |
| | | 318/48 |
| 2003/0003178 A1* | 1/2003 | Kami ..................... B22D 17/26 |
| | | 425/150 |

FOREIGN PATENT DOCUMENTS

JP          2016-002745 A       1/2016

* cited by examiner

*Primary Examiner* — James Sanders
(74) *Attorney, Agent, or Firm* — Robert P. Michal, Esq.; Carter, DeLuca & Farrell LLP (57) ABSTRACT

A phase adjusting device includes: a torque acquisition unit acquiring a torque; a position acquisition unit acquiring the rotational position of the first motor; a first motor control unit rotating the first motor in a first rotational direction until the torque exceeds a threshold, and then in a second rotational direction until the torque exceeds the threshold again; a storage control unit storing, in a storage unit, a first rotational position when the first motor is rotated in the first rotational direction and the torque exceeds the threshold and a second rotational position when the first motor is rotated in the second rotational direction and the torque exceeds the threshold again; a phase position calculator calculating a third rotational position, based on the first and second rotational positions; and a second motor control unit rotating the first motor to the third rotational position.

11 Claims, 5 Drawing Sheets

PHASE ADJUSTING DEVICE AND PHASE ADJUSTING METHOD

CROSS-REFERENCE TO RELATED APPLICATIONS

This application is based upon and claims the benefit of priority from Japanese Patent Applications No. 2019-179934 filed on Sep. 30, 2019, and No. 2020-133583 filed on Aug. 6, 2020, the contents all of which are incorporated herein by reference.

BACKGROUND OF THE INVENTION

Field of the Invention

The present invention relates to a phase adjusting device and a phase adjusting method for a drive device.

Description of the Related Art

In the drive device of the injection device of the injection molding machine described in Japanese Laid-Open Patent Publication No. 2016-002745, the movable part provided with a plunger is linearly driven by two drive shafts. Each of the two drive shafts includes a motor and a driving force transmission mechanism that converts the rotational force of the motor into a linear motion. These driving force transmission mechanisms have backlashes, which usually cause a time lag between the time when each of the two motors starts rotating and the time when the movable part starts moving. Because of the backlash, the two drive shafts have different initial phases, and the movable part is mostly moved only by one drive shaft. If the initial phases of the two drive shafts are not aligned with each other, troubles will occur such as mechanical distortion, extra loads on the motors, and misalignment due to tilting of the injection mechanism. Therefore, adjustment of the origin of the drive shafts in the injection molding machine requires adjustment so as to match the initial phases of the two drive shafts to be synchronously controlled. Japanese Laid-Open Patent Publication No. 2016-002745 discloses a configuration in which phase difference adjusting pulleys are provided to match the initial phases of two drive shafts to be synchronously controlled, with respect to their backlashes.

SUMMARY OF THE INVENTION

However, in Japanese Laid-Open Patent Publication No. 2016-002745, it is necessary to provide an additional mechanism such as phase difference adjusting pulleys, and yet there is no description of a specific adjusting method.

It is therefore an object of the present invention to provide a phase adjusting device and a phase adjusting method which can, with a simple configuration, align the initial phases of two drive shafts to be synchronously controlled.

A first aspect of the present invention resides in a phase adjusting device for a drive device including a first motor and a second motor configured to move a movable part, a first driving force transmission mechanism configured to convert a rotational force of the first motor into a linear force and transmit the linear force to the movable part, and a second driving force transmission mechanism configured to convert a rotational force of the second motor into a linear force and transmit the linear force to the movable part, the phase adjusting device comprising: a torque acquisition unit configured to acquire a torque of the first motor or the second motor; a position acquisition unit configured to acquire a rotational position of the first motor; a first motor control unit configured to rotate the first motor in a first rotational direction until the torque exceeds a threshold, and then rotate the first motor in a second rotational direction opposite to the first rotational direction until the torque exceeds the threshold again; a storage control unit configured to store the rotational position of the first motor when the first motor is rotated in the first rotational direction and the torque exceeds the threshold, in a storage unit as a first rotational position, and store the rotational position of the first motor when the first motor is rotated in the second rotational direction and the torque exceeds the threshold again, in the storage unit as a second rotational position; a phase position calculator configured to calculate, as a third rotational position and based on the first rotational position and the second rotational position, a rotational position of the first motor at which a relative position of the movable part in a backlash of the second driving force transmission mechanism and a relative position of the movable part in a backlash of the first driving force transmission mechanism coincide with each other within a predetermined range; and a second motor control unit configured to rotate the first motor to the third rotational position.

A second aspect of the present invention resides in a phase adjusting method for a drive device including a first motor and a second motor configured to move a movable part, a first driving force transmission mechanism configured to convert a rotational force of the first motor into a linear force and transmit the linear force to the movable part, and a second driving force transmission mechanism configured to convert a rotational force of the second motor into a linear force and transmit the linear force to the movable part, the phase adjusting method comprising: a torque acquisition step of acquiring a torque of the first motor or the second motor; a position acquisition step of acquiring a rotational position of the first motor; a first motor controlling step of rotating the first motor in a first rotational direction until the torque exceeds a threshold; a first storage controlling step of storing the rotational position of the first motor when the first motor is rotated in the first rotational direction and the torque exceeds the threshold, in a storage unit as a first rotational position; a second motor controlling step of rotating the first motor in a second rotational direction opposite to the first rotational direction until the torque exceeds the threshold again; a second storage controlling step of storing the rotational position of the first motor when the first motor is rotated in the second rotational direction and the torque exceeds the threshold again, in the storage unit as a second rotational position; a phase position calculating step of calculating, as a third rotational position and based on the first rotational position and the second rotational position, a rotational position of the first motor at which a relative position of the movable part in a backlash of the second driving force transmission mechanism and a relative position of the movable part in a backlash of the first driving force transmission mechanism coincide with each other within a predetermined range; and a third motor controlling step of rotating the first motor to the third rotational position.

According to the present invention, it is possible with a simple configuration to align the initial phases of the two drive shafts to be synchronously controlled.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A phase adjusting device and a phase adjusting method according to the present invention will be described in detail below in connection with a preferred embodiment with reference to the accompanying drawings.

Embodiment

Figure 1:
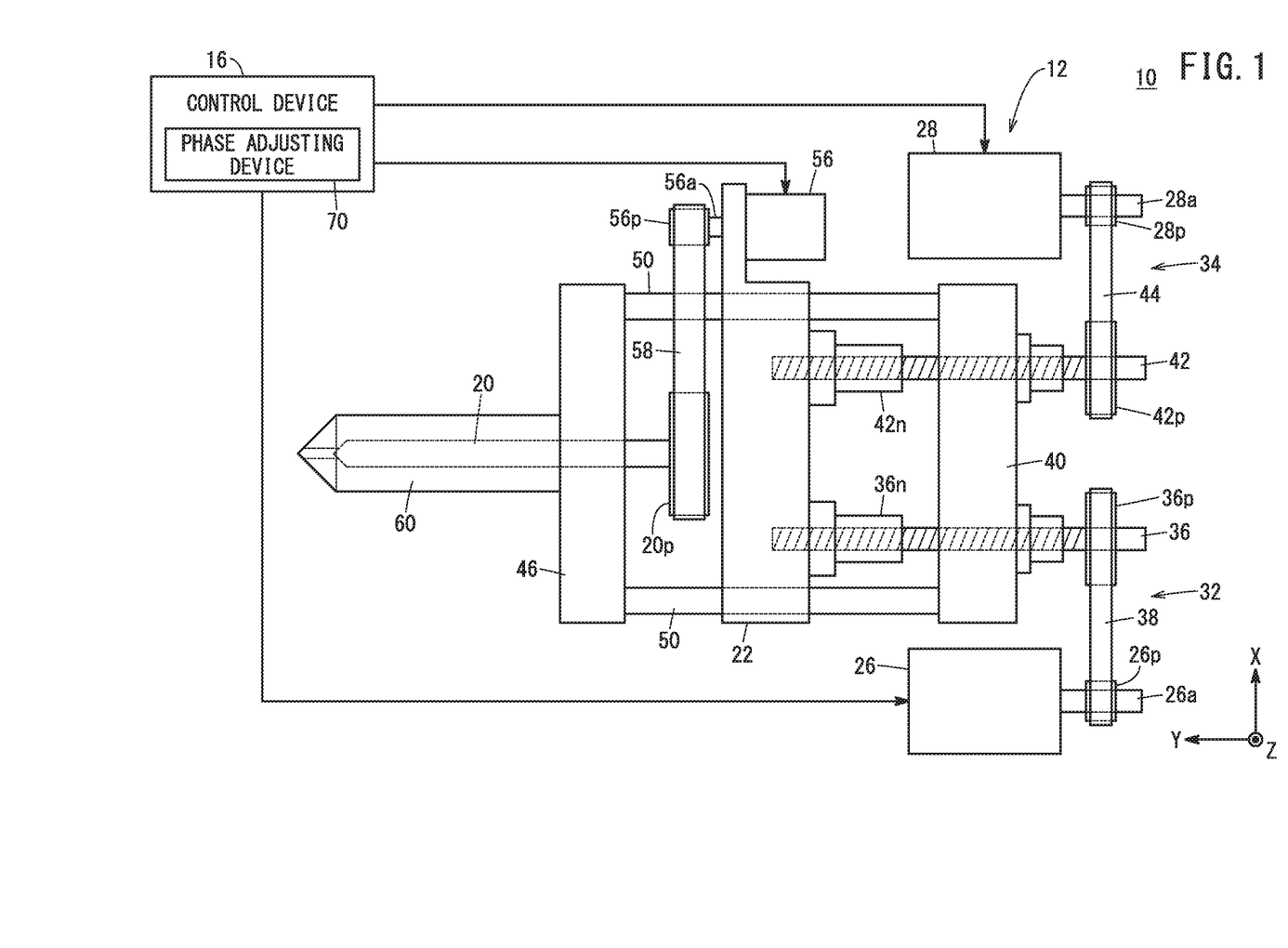
FIG. 1 is a top view of an injection device according to an embodiment.

FIG. 1 is a top view of an injection device 10 according to an embodiment. The X direction, the Y direction, and the Z direction shown in FIG. 1 are orthogonal to each other, and gravity acts in the negative Z direction. An injection molding machine includes the injection device 10 and a clamping device, however the clamping device is not shown here.

The injection device 10 includes a drive device 12 and a control device 16 that controls the drive device 12.

The drive device 12 includes a movable part 22 provided with a plunger 20, a first motor 26 and a second motor 28 for moving the movable part 22, a first driving force transmission mechanism 32 and a second driving force transmission mechanism 34.

The first driving force transmission mechanism 32 includes a pulley 26p fixed to a motor shaft 26a of the first motor 26, a ball screw 36, a pulley 36p fixed to the ball screw 36, a belt 38 wound between the pulley 26p and the pulley 36p, and a nut 36n engaging with the ball screw 36. The ball screw 36 is arranged to pass through a fixing part 40 and rotate about an axis in the Y direction as a rotation axis, but is fixed so as not to move relative to the fixing part 40 in the Y direction. The nut 36n is fixed to the movable part 22. Therefore, the first driving force transmission mechanism 32 converts the rotational force of the first motor 26 into a linear force and transmits the linear force to the movable part 22. The first motor 26 and the first driving force transmission mechanism 32 constitute one drive shaft (first drive shaft).

The second driving force transmission mechanism 34 includes a pulley 28p fixed to a motor shaft 28a of the second motor 28, a ball screw 42, a pulley 42p fixed to the ball screw 42, and a belt 44 wound between the pulley 28p and the pulley 42p, and a nut 42n engaging with the ball screw 42. The ball screw 42 is arranged to pass through the fixing part 40 and rotate about an axis in the Y direction as a rotation axis, but is fixed so as not to move relative to the fixing part 40 in the Y direction. The nut 42n is fixed to the movable part 22. Therefore, the second driving force transmission mechanism 34 converts the rotational force of the second motor 28 into a linear force and transmits the linear force to the movable part 22. The second motor 28 and the second driving force transmission mechanism 34 constitute one drive shaft (second drive shaft).

Note that drive shafts having the same size and shape are used as the first drive shaft and the second drive shaft. Therefore, the backlash of the first driving force transmission mechanism 32 and the backlash of the second driving force transmission mechanism 34 have substantially the same size (width).

The fixing part 40 and a fixing part 46 are joined by four bars 50 extending in the Y direction. In FIG. 1, the two bars existing on the negative Z direction side are hidden by the bars in the front and thus cannot be seen. The four bars 50 penetrate through the movable part 22. The movable part 22 is able to move along the four bars 50 in the Y direction and negative Y direction.

The movable part 22 is provided with a motor 56 for rotating the plunger 20. A belt 58 is wound between a pulley 56p fixed to a motor shaft 56a of the motor 56, and a pulley 20p fixed to the plunger 20. The plunger 20 penetrates through the fixing part 46 and is inserted into a barrel 60. Therefore, the plunger 20 is driven to rotate by the motor 56, and the movable part 22 moves in the Y direction so that the plunger 20 is inserted to the inner tip of the barrel 60. With this configuration, the injection device 10 can inject molten resin or the like supplied to the barrel 60, into the clamping device through the opening at the tip of the barrel 60.

Figure 2:
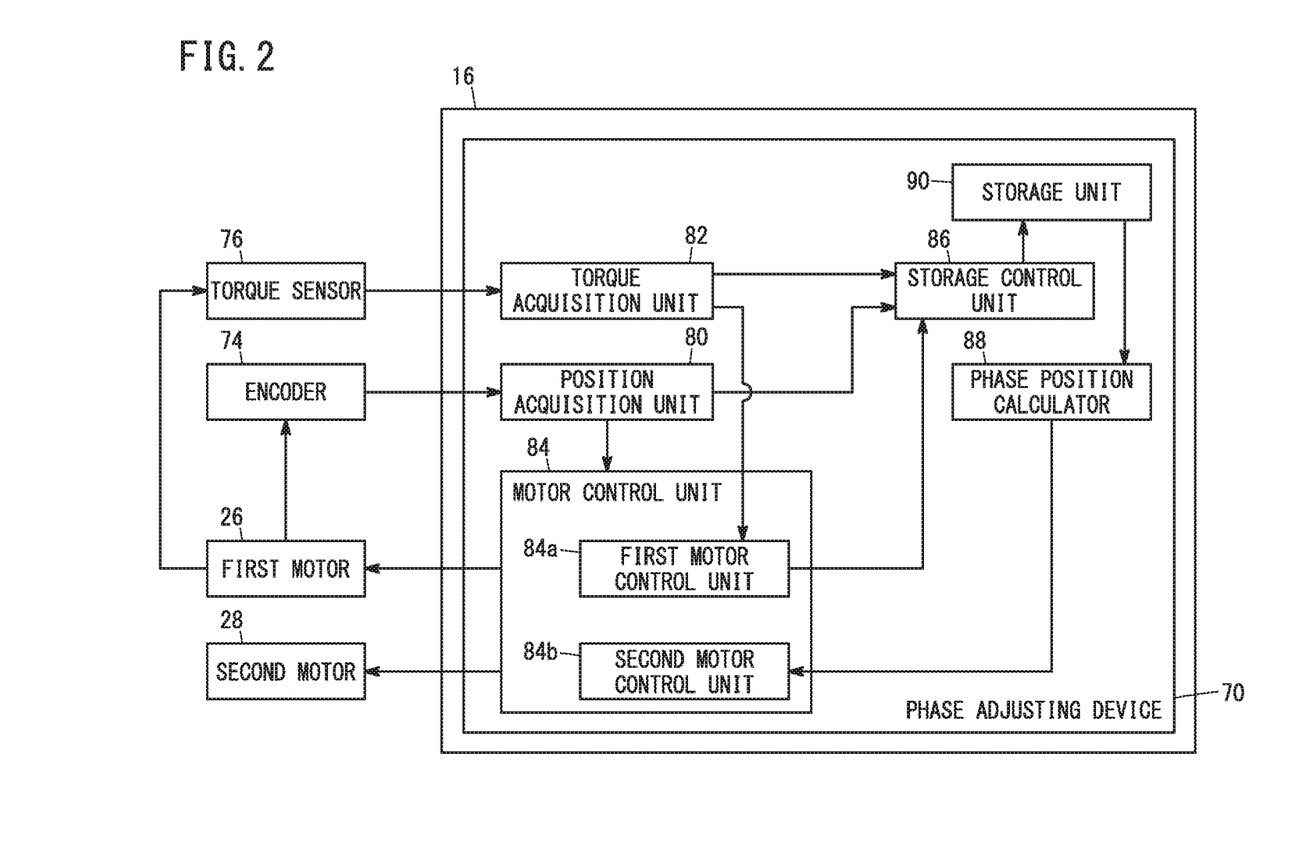
FIG. 2 is a diagram showing a configuration of a control device in an embodiment.

FIG. 2 is a diagram showing a configuration of the control device 16 in the embodiment. The control device 16 has a processor such as a CPU and a memory, and functions as the control device 16 of the present embodiment by executing a program stored in the memory. The control device 16 includes a phase adjusting device 70. Although not shown in FIG. 1, the first motor 26 is connected to an encoder 74 for measuring the rotational position of the first motor 26, and a torque sensor 76 for measuring the torque (a scalar value, the absolute value of torque) of the first motor 26.

The phase adjusting device 70 includes a position acquisition unit 80, a torque acquisition unit 82, a motor control unit 84, a storage control unit 86, a phase position calculator 88, and a storage unit 90.

The position acquisition unit 80 acquires the rotational position of the first motor 26 measured by the encoder 74. The torque acquisition unit 82 acquires the torque of the first motor 26 measured by the torque sensor 76. The torque acquisition unit 82 calculates and acquires the torque based on the current flowing through the first motor 26, for example.

The motor control unit 84 controls the first motor 26 and the second motor 28. The motor control unit 84 includes a first motor control unit 84a and a second motor control unit 84b in order to execute the control described below.

The storage control unit 86 stores the rotational position of the first motor 26 in the storage unit 90.

The phase position calculator 88 calculates the adjusted phase position based on the rotational position of the first motor 26 stored in the storage unit 90. The adjusted phase position will be described later.

Figure 3:
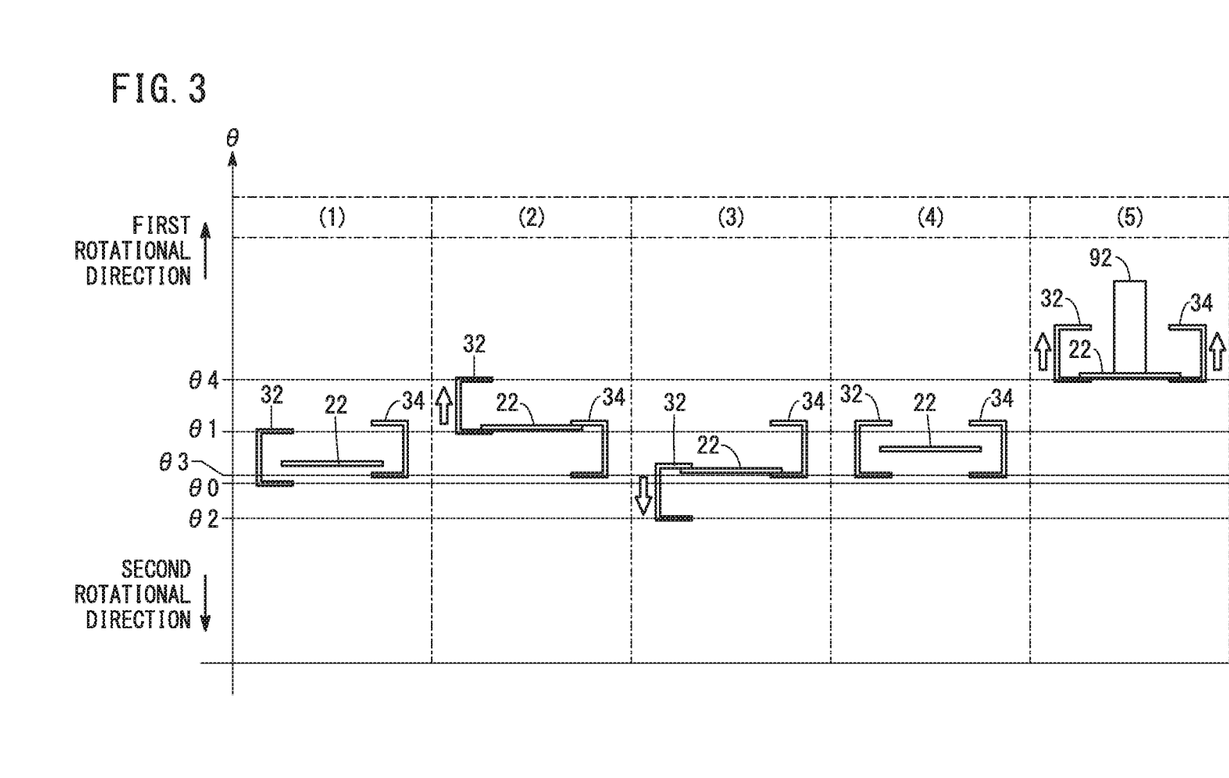
FIG. 3 is a conceptual diagram illustrating a phase adjusting method according to an embodiment.

FIG. 3 is a conceptual diagram for explaining the phase adjusting method of the embodiment. FIG. 3-(1) shows a relationship between the initial states of the movable part 22, the first driving force transmission mechanism 32, and the second driving force transmission mechanism 34 before commencement of phase adjustment. The vertical axis in FIG. 3 represents the rotational position θ of the motor shaft 26a of the first motor 26, and the upper direction of the vertical axis indicates a first rotational direction, whereas the lower direction indicates a second rotational direction that is opposite to the first rotational direction. As shown in FIG. 3, the positional relationship between the first driving force transmission mechanism 32 and the movable part 22 has a degree of freedom corresponding to the width of the backlash of the first driving force transmission mechanism 32. Similarly, the positional relationship between the second driving force transmission mechanism 34 and the movable part 22 has a degree of freedom corresponding to the width of the backlash of the second driving force transmission mechanism 34. Here, the backlash of the first driving force transmission mechanism 32 is the backlash between the first motor 26 and the movable part 22, and the backlash of the second driving force transmission mechanism 34 is the backlash between the second motor 28 and the movable part 22. Because of these backlashes, when the two drive shafts are controlled synchronously, it is preferred that the relative position of the movable part 22 in the backlash of the first driving force transmission mechanism 32 coincides with the relative position of the movable part 22 in the backlash of the second driving force transmission mechanism 34.

Figure 4:
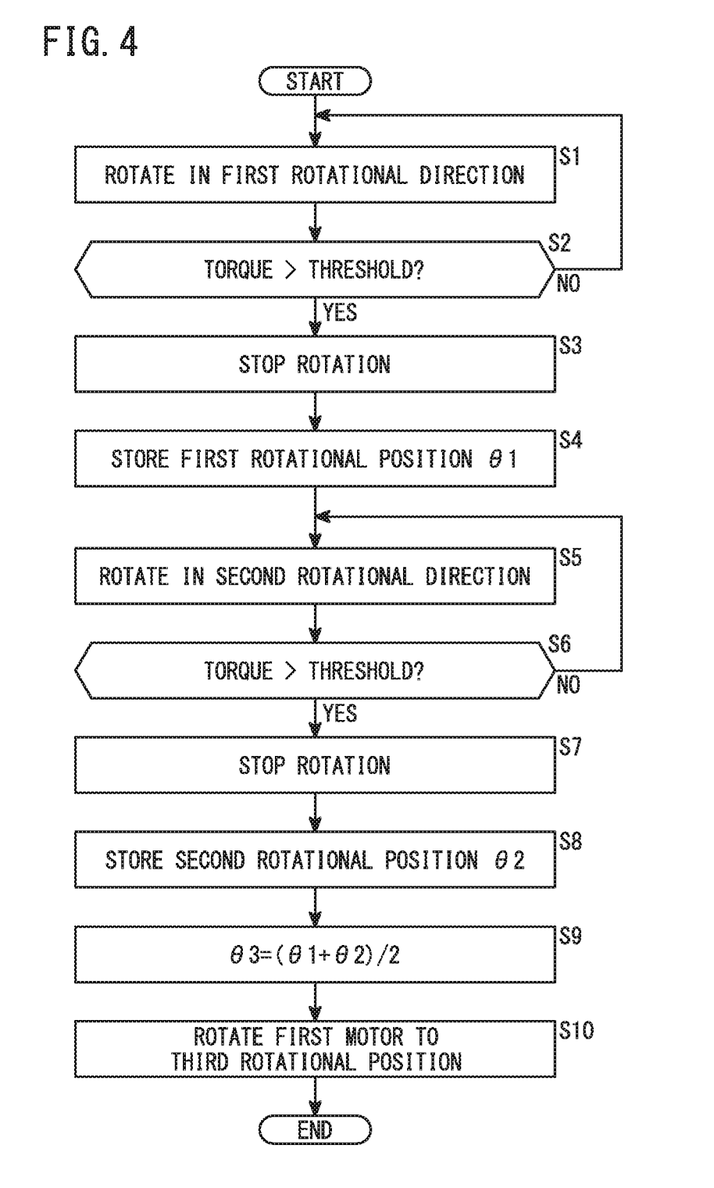
FIG. 4 is a flowchart for explaining a phase adjusting method according to an embodiment.

For example, even if the first motor 26 and the second motor 28 are rotated synchronously in the first rotational direction while the relative position of the movable part 22 in the backlash of the first driving force transmission mechanism 32 and the relative position of the movable part 22 in the backlash of the second driving force transmission mechanism 34 are out of alignment as shown in FIG. 3-(1), the movable part 22 is moved mainly by the second driving force transmission mechanism 34. Therefore, the relative position of the movable part 22 in the backlash of the first driving force transmission mechanism 32 and the relative position of the movable part 22 in the backlash of the second driving force transmission mechanism 34 are preferably made coincident with each other within a predetermined range. In the present embodiment, the phase of the first motor 26 is adjusted in order to align the initial phases of the two drive shafts that are to be synchronously controlled. FIG. 4 is a flowchart for explaining the phase adjusting method according to the embodiment.

In the initial state in FIG. 3-(1), the motor shaft 26a of the first motor 26 is located at a rotational position θ0. From this state, the phase adjustment is started according to the flowchart of FIG. 4.

First, the first motor control unit 84a rotates the first motor 26 in the first rotational direction (step S1). At this time, the first motor control unit 84a may control the rotational position of the second motor 28 to be fixed. By fixing the rotational position of the second motor 28, the phase adjustment can be executed more reliably. It should be noted that when the first motor 26 is rotated, the movable part 22 may move due to mechanical friction or the like even if the movable part 22 is located at an intermediate position of the width of the backlash of the first driving force transmission mechanism 32.

Then, the first motor control unit 84a determines whether the torque acquired by the torque acquisition unit 82 exceeds a predetermined threshold (step S2). If the torque is equal to or less than the threshold (step S2: NO), the control returns to step S1.

In the case where the torque exceeds the threshold (step S2: YES), the first motor control unit 84a stops the rotation of the first motor 26 (step S3). Here, the case where the torque exceeds the threshold is the state shown in FIG. 3-(2). In this state, the backlash between the first motor 26 and the movable part 22 in the first rotational direction and the backlash between the second motor 28 and the movable part 22 in the second rotational direction are both eliminated, so that the torque exceeds the threshold. Then, the first motor control unit 84a stores the rotational position of the first motor 26 acquired by the position acquisition unit 80 in the storage unit 90 as a first rotational position 81 (step S4).

After step S4, the first motor control unit 84a rotates the first motor 26 in the second rotational direction opposite to the first rotational direction (step S5). At this time, the first motor control unit 84a may control the rotational position of the second motor 28 to be fixed. By fixing the rotational position of the second motor 28, the phase adjustment can be executed more reliably.

Then, the first motor control unit 84a determines whether the torque acquired by the torque acquisition unit 82 exceeds the predetermined threshold again (step S6). When the torque is equal to or less than the threshold (step S6: NO), the control returns to step S5.

In the case where the torque exceeds the threshold again (step S6: YES), the first motor control unit 84a stops the rotation of the first motor 26 (step S7). Here, the case where the torque exceeds the threshold again is the state shown in FIG. 3-(3) In this state, the backlash between the first motor 26 and the movable part 22 in the second rotational direction and the backlash between the second motor 28 and the movable part 22 in the first rotational direction are both eliminated, so that the torque again exceeds the threshold. Then, the first motor control unit 84a stores the rotational position of the first motor 26 acquired by the position acquisition unit 80 in the storage unit 90 as a second rotational position 82 (step S8). At steps S2 and S6, the determination is made based on the magnitude (absolute value) of the torque of the first motor 26 without considering the direction of rotation.

Then, the phase position calculator 88 calculates $(\theta 1+\theta 2)/2$, which is the average value of the first rotational position 81 and the second rotational position 82, as a third rotational position 83 (step S9). The third rotational position 83 is the adjusted phase position.

After step S9, the second motor control unit 84b rotates the first motor 26 to the third rotational position 83 (step S10). At this time, the second motor control unit 84b may control the rotational position of the second motor 28 to be fixed. By fixing the rotational position of the second motor 28, the phase adjustment can be executed more reliably. FIG. 3-(4) shows the state after step S10. Thus, the relative position of the movable part 22 in the backlash of the second driving force transmission mechanism 34 and the relative position of the movable part 22 in the backlash of the first driving force transmission mechanism 32 can be made coincident with each other within a predetermined range, so that the initial phases of the two drive shafts to be synchronously controlled can be aligned.

The above description has been made using the torque of the first motor 26. However, acquisition and comparison of the torque of the second motor 28 makes it possible to perform the same phase adjustment as above. Additionally, when the movable part 22 is rotated in the first rotational direction from the state shown in FIG. 3-(3) to the third rotational position θ3, the movable part 22 moves due to mechanical friction. Therefore, the position of the movable part 22 shown in FIG. 3-(4) is moved from the position of the movable part 22 shown in FIG. 3-(3).

As described heretofore, according to the phase adjusting device 70 of the embodiment, it is possible, with a simpler configuration than the conventional one, to align the initial phases of the two drive shafts to be synchronously controlled, without the need of providing an additional mechanism. As a result, it is possible to prevent mechanical distortion, extra loads on the motors, and misalignment due to tilting of the injection mechanism.

Figure 5:
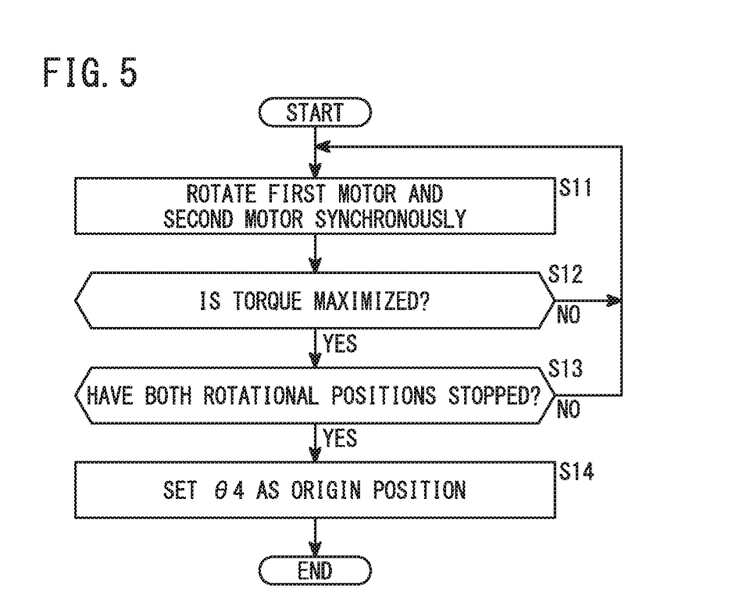
FIG. 5 is a flowchart for explaining an operation of setting a first motor and a second motor to the origin position.

After the phase adjusting device 70 adjusts the phase position of the first motor 26 according to the flowchart of FIG. 4, the motor control unit 84 rotates the first motor 26 and the second motor 28 to set their origin positions. FIG. 5 is a flowchart for explaining the operation of setting the origin positions of the first motor 26 and the second motor 28. Here, a stopper 92 (see FIG. 3) against the movable part 22 is installed to set the origin positions of the first motor 26 and the second motor 28. The position of the movable part 22 restricted by the stopper 92 is the origin position of the movable part 22. Actually, the tip of the plunger 20 that moves together with the movable part 22 comes into contact with the inner tip of the barrel 60, whereby the movable part 22 returns to the origin position. That is, the stopper 92 conceptually represents restriction of the movement of the movable part 22 by the contact between the tip of the plunger 20 and the inner tip of the barrel 60.

First, the motor control unit 84 causes the first motor 26 and the second motor 28 to rotate synchronously in the same direction of rotation (step S11).

Next, the motor control unit 84 determines whether the torque acquired by the torque acquisition unit 82 is maximized (step S12). The torque is considered to be maximized when the torque reaches a predetermined value. When the torque is not maximized (step S12: NO), the control returns to step S11.

When the torque is maximized (step S12: YES), the motor control unit 84 determines whether or not both the rotational position of the first motor 26 measured by the encoder 74 and the rotational position of the second motor 28 measured by an unillustrated encoder have stopped. (step S13). If one of the rotational positions has not stopped (step S13: NO), the control returns to step S11.

When both the rotational position of the first motor 26 and the rotational position of the second motor 28 are stopped (step S13: YES), the rotational position, named as θ4, is set as the origin positions of the first motor 26 and the second motor 28 (Step S14). FIG. 3-(5) shows the condition of step S14 in which the movable part 22 is in contact with the stopper 92. Thus, by rotating the first motor 26 and the second motor 28 up to the rotational position 84, the phase of the first motor 26 within the backlash of the first motor 26 with respect to the movable part 22 and the phase of the second motor 28 within the backlash of the second motor 28 with respect to the movable part 22 can be aligned and the movable part 22 can be moved to the origin position. Thereafter, the operation of the injection device 10 can be appropriately implemented.

Invention Obtained from the Embodiment

The invention grasped from the above embodiment will be described as follows:

First Aspect of the Invention

A phase adjusting device (70) is one for a drive device (12) including a first motor (26) and a second motor (28) configured to move a movable part (22), a first driving force transmission mechanism (32) configured to convert a rotational force of the first motor (26) into a linear force and transmit the linear force to the movable part (22), and a second driving force transmission mechanism (34) configured to convert a rotational force of the second motor (28) into a linear force and transmit the linear force to the movable part (22). The phase adjusting device (70) comprises: a torque acquisition unit (82) configured to acquire a torque of the first motor (26) or the second motor (28); a position acquisition unit (80) configured to acquire a rotational position of the first motor (26); a first motor control unit (84a) configured to rotate the first motor (26) in a first rotational direction until the torque exceeds a threshold, and then rotate the first motor (26) in a second rotational direction opposite to the first rotational direction until the torque exceeds the threshold again; a storage control unit (86) configured to store the rotational position of the first motor (26) when the first motor (26) is rotated in the first rotational direction and the torque exceeds the threshold, in a storage unit (90) as a first rotational position (θ1), and store the rotational position of the first motor (26) when the first motor (26) is rotated in the second rotational direction and the torque exceeds the threshold again, in the storage unit (90) as a second rotational position (θ2); a phase position calculator (88) configured to calculate, as a third rotational position (θ3) and based on the first rotational position (θ1) and the second rotational position (θ2), a rotational position of the first motor (26) at which a relative position of the movable part (22) in a backlash of the second driving force transmission mechanism (34) and a relative position of the movable part (22) in a backlash of the first driving force transmission mechanism (32) coincide with each other within a predetermined range; and a second motor control unit (84b) configured to rotate the first motor (26) to the third rotational position (θ3).

This makes it possible, with a simpler configuration than the conventional one, to align the initial phases of the two drive shafts that are to be synchronously controlled. As a result, it is possible to prevent mechanical distortion, extra loads on the motors, and misalignment due to tilting of the injection mechanism.

The first motor control unit (84a) and the second motor control unit (84b) may be configured to fix a rotational position of the second motor (28) when the first motor (26) is rotated. This makes it possible to execute the phase adjustment of the first motor (26) more reliably.

The phase position calculator (88) may be configured to calculate an average of the first rotational position (θ1) and the second rotational position (θ2) as the third rotational position (θ3). As a result, the relative position of the movable part (22) in the backlash between the second motor (28) and the movable part (22) and the relative position of the movable part (22) in the backlash between the first motor (26) and the movable part (22) can be made coincident with each other with high precision.

The first driving force transmission mechanism (32) and the second driving force transmission mechanism (34) may each include two pulleys (26p, 36p; 28p, 42p), a belt (38, 44) that is wound between the two pulleys (26p, 36p; 28p, 42p), a ball screw (36, 42), and a nut (36n, 42n) engaging with the ball screw (36, 42).

The drive device (12) may be provided in an injection device (10).

The phase adjusting device (70) may be provided in a control device (16) configured to control the injection device (10).

Second Aspect of the Invention

A phase adjusting method is one for a drive device (12) including a first motor (26) and a second motor (28) configured to move a movable part (22), a first driving force transmission mechanism (32) configured to convert a rotational force of the first motor (26) into a linear force and transmit the linear force to the movable part (22), and a second driving force transmission mechanism (34) configured to convert a rotational force of the second motor (28) into a linear force and transmit the linear force to the movable part (22). The phase adjusting method comprises: a torque acquisition step of acquiring a torque of the first motor (26) or the second motor (28); a position acquisition step of acquiring a rotational position of the first motor (26); a first motor controlling step of rotating the first motor (26) in a first rotational direction until the torque exceeds a threshold; a first storage controlling step of storing the rotational position of the first motor (26) when the first motor (26) is rotated in the first rotational direction and the torque exceeds the threshold, in a storage unit (90) as a first rotational position ($\theta 1$); a second motor controlling step of rotating the first motor (26) in a second rotational direction opposite to the first rotational direction until the torque exceeds the threshold again; a second storage controlling step of storing the rotational position of the first motor (26) when the first motor (26) is rotated in the second rotational direction and the torque exceeds the threshold again, in the storage unit (90) as a second rotational position ($\theta 2$); a phase position calculating step of calculating, as a third rotational position ($\theta 3$) and based on the first rotational position ($\theta 1$) and the second rotational position ($\theta 2$), a rotational position of the first motor (26) at which a relative position of the movable part (22) in a backlash of the second driving force transmission mechanism (34) and a relative position of the movable part (22) in a backlash of the first driving force transmission mechanism (32) coincide with each other within a predetermined range; and a third motor controlling step of rotating the first motor (26) to the third rotational position ($\theta 3$).

This makes it possible, with a simpler configuration than the conventional one, to align the initial phases of the two drive shafts that are to be synchronously controlled. As a result, it is possible to prevent mechanical distortion, extra loads on the motors, and misalignment due to tilting of the injection mechanism.

In the first motor controlling step, the second motor controlling step and the third motor controlling step, a rotational position of the second motor (28) may be fixed when the first motor (26) is rotated. This makes it possible to execute the phase adjustment of the first motor (26) more reliably.

In the phase position calculating step, an average of the first rotational position ($\theta 1$) and the second rotational position ($\theta 2$) may be calculated as the third rotational position ($\theta 3$). As a result, the relative position of the movable part (22) in the backlash between the second motor (28) and the movable part (22) and the relative position of the movable part (22) in the backlash between the first motor (26) and the movable part (22) can be made coincident with each other with high precision.

The first driving force transmission mechanism (32) and the second driving force transmission mechanism (34) may each include two pulleys (26p, 36p; 28p, 42p), a belt (38, 44) that is wound between the two pulleys (26p, 36p; 28p, 42p), a ball screw (36, 42), and a nut (36n, 42n) engaging with the ball screw (36, 42).

The drive device (12) may be provided in an injection device (10).

What is claimed is:

1. A phase adjusting device for a drive device including a first motor and a second motor configured to move a movable part, a first driving force transmission mechanism configured to convert a rotational force of the first motor into a linear force and transmit the linear force to the movable part, and a second driving force transmission mechanism configured to convert a rotational force of the second motor into a linear force and transmit the linear force to the movable part, the phase adjusting device comprising:
a torque acquisition unit configured to acquire a torque of the first motor or the second motor;
a position acquisition unit configured to acquire a rotational position of the first motor;
a first motor control unit configured to rotate the first motor in a first rotational direction until the torque exceeds a threshold, and then rotate the first motor in a second rotational direction opposite to the first rotational direction until the torque exceeds the threshold again;
a storage control unit configured to store the rotational position of the first motor when the first motor is rotated in the first rotational direction and the torque exceeds the threshold, in a storage unit as a first rotational position, and store the rotational position of the first motor when the first motor is rotated in the second rotational direction and the torque exceeds the threshold again, in the storage unit as a second rotational position, and
a phase position calculator configured to calculate, as a third rotational position and based on the first rotational position and the second rotational position, a rotational position of the first motor at which a relative position of the movable part in a backlash of the second driving force transmission mechanism and a relative position of the movable part in a backlash of the first driving force transmission mechanism coincide with each other within a predetermined range; and
a second motor control unit configured to rotate the first motor to the third rotational position.

2. The phase adjusting device according to claim 1, wherein the first motor control unit and the second motor control unit are configured to fix a rotational position of the second motor when the first motor is rotated.

3. The phase adjusting device according to claim 1, wherein the phase position calculator is configured to calculate an average of the first rotational position and the second rotational position as the third rotational position.

4. The phase adjusting device according to claim 1, wherein the first driving force transmission mechanism and the second driving force transmission mechanism each include two pulleys, a belt that is wound between the two pulleys, a ball screw, and a nut engaging with the ball screw.

5. The phase adjusting device according to claim 1, wherein the drive device is provided in an injection device.

6. The phase adjusting device according to claim 5, wherein the phase adjusting device is provided in a control device configured to control the injection device.

7. A phase adjusting method for a drive device including a first motor and a second motor configured to move a movable part, a first driving force transmission mechanism configured to convert a rotational force of the first motor into a linear force and transmit the linear force to the movable part, and a second driving force transmission mechanism configured to convert a rotational force of the second motor into a linear force and transmit the linear force to the movable part, the phase adjusting method comprising:

a torque acquisition step of acquiring a torque of the first motor or the second motor;

a position acquisition step of acquiring a rotational position of the first motor;

a first motor controlling step of rotating the first motor in a first rotational direction until the torque exceeds a threshold;

a first storage controlling step of storing the rotational position of the first motor when the first motor is rotated in the first rotational direction and the torque exceeds the threshold, in a storage unit as a first rotational position;

a second motor controlling step of rotating the first motor in a second rotational direction opposite to the first rotational direction until the torque exceeds the threshold again;

a second storage controlling step of storing the rotational position of the first motor when the first motor is rotated in the second rotational direction and the torque exceeds the threshold again, in the storage unit as a second rotational position;

a phase position calculating step of calculating, as a third rotational position and based on the first rotational position and the second rotational position, a rotational position of the first motor at which a relative position of the movable part in a backlash of the second driving force transmission mechanism and a relative position of the movable part in a backlash of the first driving force transmission mechanism coincide with each other within a predetermined range; and a third motor controlling step of rotating the first motor to the third rotational position.

8. The phase adjusting method according to claim 7, wherein, in the first motor controlling step, the second motor controlling step and the third motor controlling step, a rotational position of the second motor is fixed when the first motor is rotated.

9. The phase adjusting method according to claim 7, wherein in the phase position calculating step, an average of the first rotational position and the second rotational position is calculated as the third rotational position.

10. The phase adjusting method according to claim 7, wherein the first driving force transmission mechanism and the second driving force transmission mechanism each include two pulleys, a belt that is wound between the two pulleys, a ball screw, and a nut engaging with the ball screw.

11. The phase adjusting method according to claim 7, wherein the drive device is provided in an injection device.

* * * * *